Oct. 16, 1945.  H. P. HEATH ET AL  2,387,067
WELDING APPARATUS
Filed May 13, 1943  2 Sheets-Sheet 1
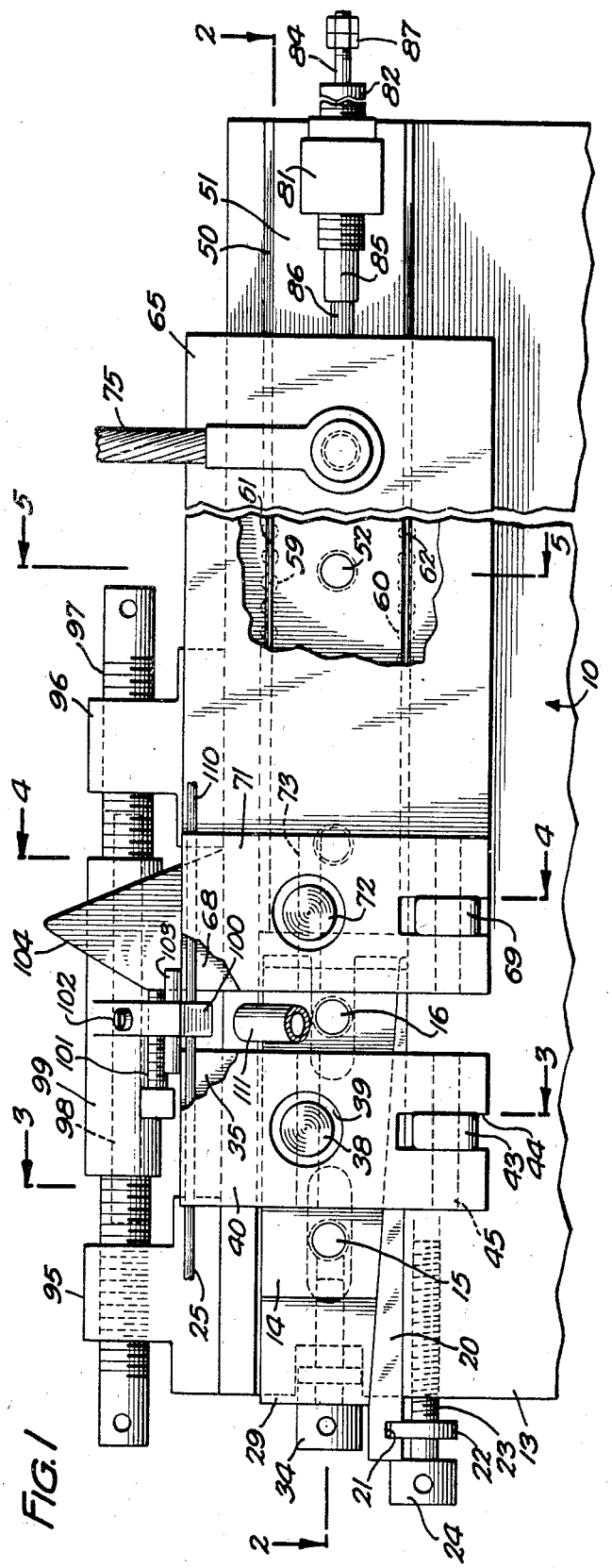
INVENTORS
H. P. HEATH
K. A. WESTON
BY Harry L. Duft
ATTORNEY Oct. 16, 1945.   H. P. HEATH ET AL   2,387,067
WELDING APPARATUS
Filed May 13, 1943   2 Sheets-Sheet 2
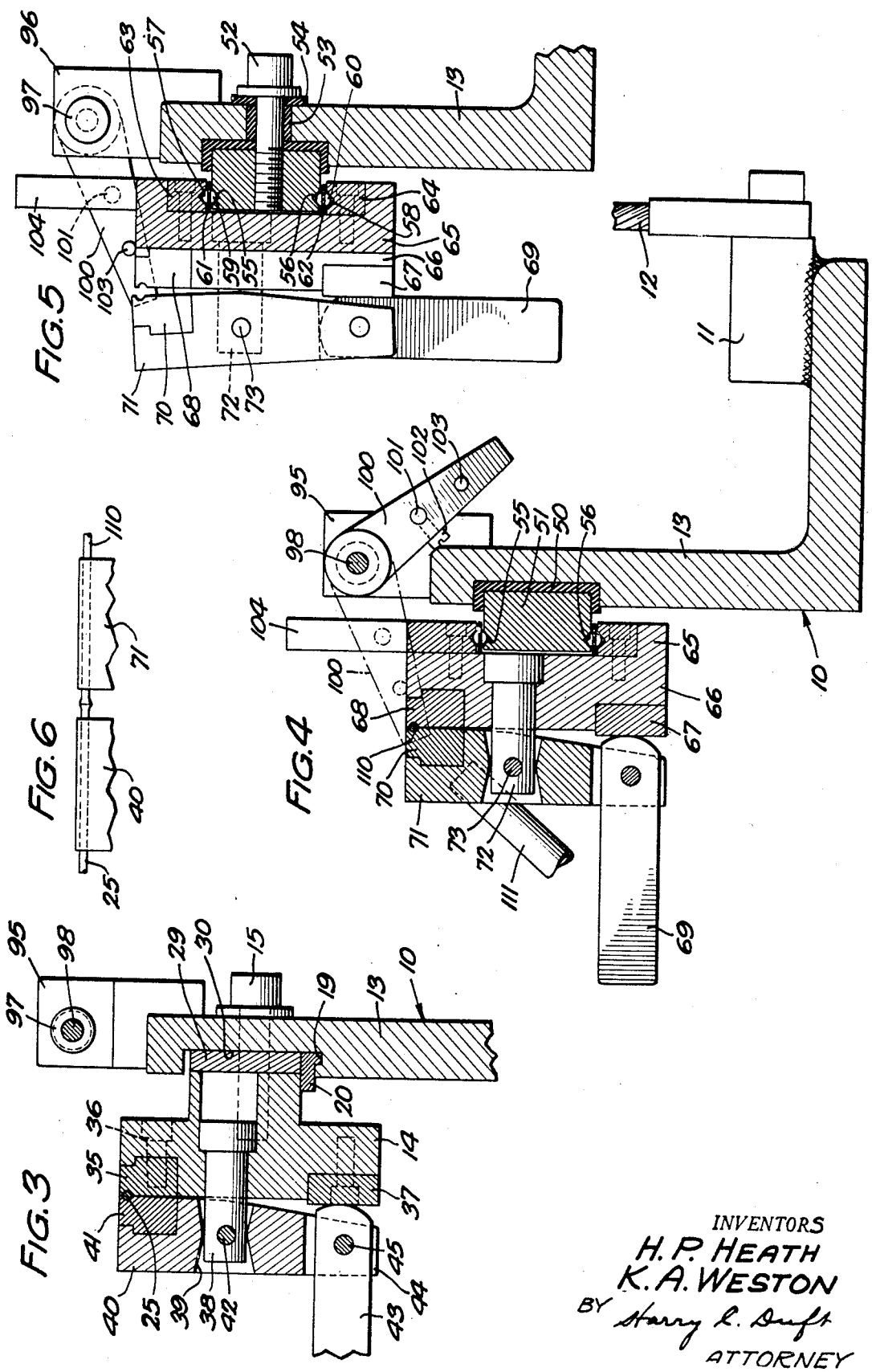
INVENTORS
H. P. HEATH
K. A. WESTON
BY Harry R. Duft
ATTORNEY Patented Oct. 16, 1945

2,387,067

UNITED STATES PATENT OFFICE 2,387,067

WELDING APPARATUS

Herbert P. Heath, Riverside, and Keith A. Weston, Chicago, Ill., assignors to Western Electric Company, Incorporated, New York, N. Y., a corporation of New York Application May 13, 1943, Serial No. 486,756

3 Claims. (Cl. 219—4)

This invention relates to welding apparatus and more particularly to a method and an apparatus for resistance butt welding wires of dissimilar metal.

In the manufacture of some radio equipment, it is desirable to provide connectors formed of two small gage rods or wires butt connected one to another. Considerable difficulty has been experienced in forming these connectors due to the fact that with ordinary welding equipment, the wires or rods, when the welding current is applied to them, either bend due to their becoming soft or become so plastic that a large upset is raised, thereby necessitating dressing the connector to remove the flash. Furthermore, in welding processes previously used, the pressure exerted on the parts was utilized to intentionally form an upset to squeeze out any impurities.

It is an object of the present invention to provide a simple and efficient apparatus for welding rods which will not damage the parts being welded together.

In accordance with one embodiment of the invention, an apparatus is provided comprising a pair of clamping jaws connected to a welding current supply and insulated one from another. One of the jaws, that is, the relatively fixed clamping jaw, is adjustable vertically and horizontally to properly align a rod or wire clamped in it with a rod or wire clamped in the relatively movable jaw which is mounted on a light-weight carriage freely slidable with respect to the relatively fixed jaw, being urged toward the fixed jaw by a compression spring adjustably mounted to exert a predetermined small amount of pressure, tending to slide the relatively movable jaws toward the relatively fixed jaws. In order to set the jaws so that the desired amount of rod or wire will extend out from each of them, a micrometrically adjustable gage is provided which may be tipped into position to be engaged by the ends of the wires in the jaws. This gage is pivoted on a rod threaded into a portion for the support of the fixed jaw and carries a threading member for properly locating the relatively movable jaw.

In the operation of the apparatus, a stream of hydrogen is directed onto the abutting ends of the wire and an operator using the apparatus will disconnect the welding current and shut off the supply of hydrogen as soon as the abutting ends of the wire begin to appear wet, whereby a weld is effected with little or no upsetting of material at the joint.

A better understanding of the invention may be had by reference to the following detailed description of the preferred embodiment thereof when considered in conjunction with the accompanying drawings, wherein Fig. 1 is a front elevational view of an apparatus embodying the invention, parts being broken away to conserve space and other parts being broken away to illustrate those parts directly in the rear of them;

Fig. 2 is a horizontal sectional view taken substantially along the line 2—2 of Fig. 1, showing some of the parts in elevation;

Fig. 3 is a fragmentary vertical sectional view taken substantially along the line 3—3 of Fig. 1 in the direction of the arrows showing details of construction of the relatively fixed clamping jaws;

Fig. 4 is a view similar to Fig. 3 showing details of construction of the relatively movable clamping jaws with the gage moved out of gaging position and the clamping jaws closed;

Fig. 5 is a fragmentary sectional view taken substantially along the line 5—5 of Fig. 1 in the direction of the arrows and showing the relatively movable clamping jaw in its open position; and Fig. 6 is a fragmentary detail view of the clamping ends of the two sets of clamping jaws with a wire or rod clamped in them after it has been welded.

In the drawings, as shown particularly in Figs. 1 and 4, the apparatus is shown mounted on an angle member 10, to which there is secured, for example by welding, a terminal block 11 having electrically connected thereto a lead 12, which extends to one side of a source of welding current (not shown). The horizontally extending flange of the angle member 10 may be suitably positioned on a bench or other supporting structure and the vertical extending flange thereof, designated 13, as shown most clearly in Figs. 1, 2 and 3, has a clamping block 14 adjustably mounted thereon by means of a pair of mounting screws 15 and 16. The mounting screws 15 and 16 extend through apertures 17 and 18 (Fig. 2) in the flange 13 and are threaded into the block 14. The flange 13 has a way 19 (Fig. 3) formed in it in which a tapered adjusting member 20 is slidable. The tapered adjusting member 20 has a notch 21 (Fig. 1) cut in it for receiving a collar 22 formed on adjustment screw 23, which is also provided with a head 24 engaging the end of the tapered adjusting member 20. After the block 14 has been located roughly in position to clamp a wire or rod 25, it may be raised or lowered to position it vertically very accurately by manipulating the screw 23.

In addition to the just described adjusting means for the relatively fixed clamping block 14, the block may be adjusted horizontally by means of a beveled adjusting member 29, which rests on the adjusting member 20 and is interposed between an indented surface 30 of the flange 13 and the rear surface of the clamping block 14. The position of the beveled adjusting member 29 may be regulated by means of an adjusting screw 31 threaded into the flange 13 and having a shoulder 32 engaging a notch 33 (Fig. 2) formed in the beveled adjusting member 29, the adjusting screw 31 being provided with an actuating head 34 which engages the end of the beveled member 29. In this manner, the clamping block 14 may be adjusted both vertically and horizontally to properly align it so that it will support the rod 25 in alignment with a rod clamped in the relatively movable clamping jaw, to be described.

The clamping block 14 (Fig. 3) has a clamping insert 35 attached to it adjacent its upper end by means of an attaching screw 36, and adjacent its lower end the clamping block 14 has a hard metal wedge block 37 mounted on it. Mounted in the clamping block 14 is a supporting rod 38, which extends into a tapered aperture 39 in a clamping lever 40. The clamping lever 40 has set into it at its upper end a clamping insert 41 adapted to cooperate with the insert 35 in gripping a rod 25. The clamping lever 40 is pivotally mounted on the clamp supporting rod 38 by a pivot pin 42, which extends through the supporting rod 38 and into the lever 40. The actuating means for the lever 40 comprises a wedging lever 43, which is mounted in a slot 44 in the lower end of the lever 40, and is pivoted on a pin 45, whereby when the wedging lever 43 is actuated, the end of the wedging lever will engage the wedge block 37 and force the clamping insert 41 mounted in the upper end of the clamping lever 40 toward the clamping insert 35 in the upper end of the block 14.

Set into the flange 13, as shown most clearly in Figs. 2, 4 and 5, is a U-shaped insulator 50, which serves to insulate a rail 51 from the flange 13. The rail 51 is, however, fixed to the flange 13 by means of machine screws 52—52, each of which is threaded into the rail 51 and insulated from the flange 13 by a sleeve 53 and a washer 54 of insulating material. In this manner, the rail 51 is fixed to, but insulated from, the flange 13.

The portion of the rail 51 which extends outwardly from the flange 13 is provided with a pair of grooves 55 and 56, which cooperate with grooves 57 and 58, respectively, to receive rows of ball bearings 59 and 60 held in retainer members 61 and 62, respectively. The grooves 57 and 58 are formed in bearing bars 63 and 64 suitably attached to a carriage 65. The carriage 65 has a projecting portion 66 (Fig. 2) in which there is set a wedge block 67 and a clamping insert 68, similar to the wedge block 37 and clamping insert 35 described hereinbefore in connection with the relatively fixed clamping jaws. The wedge block 67 cooperates with the lever 69, similar to the lever 43, and the insert 68 cooperates with a clamping insert 70, similar to the clamping insert 41, the lever 69 and insert 70 being mounted on a clamping lever 71, which is, in turn, pivotally positioned on the projection 66 by means of a support 72 and pin 73. The carriage 65, and, consequently, the relatively movable clamping jaws carried thereby are in electrical connection with the source of welding current through a flexible connection 75 (Fig. 1). A rod or wire 110 may be clamped between the clamping inserts 68 and 70 for welding to the rod 25.

Mounted on the rail 51, as shown most clearly in Figs. 1 and 2, is a supporting member 81, into which is threaded a cylinder 82. The cylinder 82 may thus be adjusted with respect to the supporting member 81 to vary the takeup of a spring 83 seated in the cylinder and surrounding the shank 84 of a plunger 85. The spring 83 bears against the base of the cylinder 82 and normally urges the plunger 85 to the left to carry a bearing member 86, mounted in the left end (Figs. 1 and 2) of the plunger, into engagement with the right end of the carriage 65, thereby to urge the carriage 65 to the left. The plunger 85 is prevented from moving beyond a predetermined point when no wires are in the apparatus by a lock nut assembly 87 threaded onto the shank 84 of the plunger and adapted to engage the right end (Figs. 1 and 2) of the cylinder 82 after the plunger 85 has travelled a predetermined distance to the left (Figs. 1 and 2).

Mounted on the upper end of the flange 13 adjacent its left end (Fig. 1) is a gage bearing 95 which cooperates with a gage bearing 96 (Figs. 1 and 5) to support a gage adjusting screw 97. The screw 97 is provided with a reduced portion 98, on which there is pivoted a gage block 99 carrying a gaging arm 100. The gaging arm 100 has threaded into it an abutment screw 101, which, after being adjusted, may be locked in place by a set screw 102. In addition to the abutment screw 101, there is mounted in the arm 100 a stop pin 103, which, when the arm 100 is in the position shown in Fig. 1, will engage the top surface of the block 14 and projection 66 to limit the movement of the arm 100 beyond the position shown in full lines in Fig. 5 and in dot and dash lines in Fig. 4. The abutment screw 101 is adapted to engage the left edge (Fig. 1) of a projection 104 formed on the bearing bar 63 and extending upwardly therefrom (Figs. 1, 4 and 5).

Suitably mounted to direct a stream of hydrogen onto the abutting ends of the rods or wires 25 and 110 is a nozzle 111, which may be connected to a source of hydrogen by any suitable valve mechanism (not shown).

A better understanding of the invention may be had by reference to the following brief description of the mode of operation thereof. In order to put the apparatus in condition for operation, the relatively fixed clamping jaws, including the inserts 35 and 41, may be adjusted vertically and horizontally by manipulating the adjusting screws 23 and 31 to bring the inserts 35 and 41 into direct alignment with the inserts 68 and 70. In this manner, the rods or wires held in the clamping inserts will, when the carriage 65 moves to the left (Figs. 1 and 2), move into abutting relation along a common axis. After thus setting the apparatus for operation, the gaging arm 100 may be moved to the position shown in Figs. 1 and 5, and after being moved to that position, the gage adjusting screw 97 and abutment screw 101 may be adjusted micrometrically to set the gaging arm 100 in a position where the adjoining ends of the wires or rods 25 and 110 which are to be welded together will be extended a predetermined distance beyond the adjacent ends of their respective clamping jaws, which distance will depend upon the type of metal from which the rods or wires are formed and after this adjustment has been made in accordance with the types of metals of the two rods to be welded together, the gaging arm 100 may be moved to the position shown in Fig. 4 to permit the wires or rods 25 and 110 to move into abutting relation and the welding current may then be applied to the lead 12 and flexible connection 75. The amount of pressure with which the carriage 65 is urged toward the relatively fixed clamping jaws may be very finely regulated by adjusting the position of the cylinder 82 with respect to its supporting member 81 and, if desired, the lock nut assembly 87 may be adjusted on the shank of the plunger 85 to limit the amount of travel of the relatively movable clamping jaws toward the relatively fixed clamping jaws when no wires are clamped in the jaws.

Just prior to connecting the welding current to the lead 12 and connection 75, the operator may open the valve (not shown) to supply hydrogen to the nozzle 111. The adjustment of the cylinder 82 should be such that the pressure of one wire or rod on the other will be approximately one-half ounce and as soon as the abutting ends of the wires appear wet, the current and hydrogen supply should be shut off.

What is claimed is:

1. In an apparatus for butt welding rods or wires, relatively fixed clamping jaws for clamping one wire in position to have another wire welded to it, a support for said relatively fixed jaws, a set of relatively movable jaws for clamping said other rod or wire in axial alignment with the first mentioned rod or wire, a carriage for supporting said relatively movable jaws, said carriage being freely slidable with respect to the support, means for urging said carriage to move in a direction to carry the relatively movable jaws toward the relatively fixed jaws, a gage lever movable to position between rods held by said jaws, means threaded in said support for rotatably supporting said gage lever to position the gage lever with respect to the fixed jaws, and a threaded abutment member threaded in said gage lever for positioning the relatively movable jaws with respect to the relatively fixed jaws.

2. In an apparatus for butt welding rods or wires one to another, relatively fixed clamping jaws, a support for said jaws, a rail member mounted on said support and insulated therefrom, a carriage freely slidable on said rail member, relatively movable clamping jaws supported by said carriage, a gage movable to position between said jaws for engaging wires clamped therein, a support for said gage threaded in the support for the clamping jaws for adjusting the position of the gage with respect to the relatively fixed clamping jaws, a threaded abutment member on said gage for positioning the relatively movable clamping jaws with respect to the relatively fixed clamping jaws whereby the amount of wire extending from each of said clamping jaws may be closely regulated, and means for urging said carriage to carry the relatively movable jaws toward the relatively fixed jaws.

3. In an apparatus for butt welding rods or wires, relatively fixed clamping jaws for clamping one wire in position to have another wire welded to it, a set of relatively movable jaws for clamping said other rod or wire in alignment with the first-mentioned rod or wire, means for supporting the relatively movable jaws for movement toward and away from the relatively fixed jaws, gage means movable to position between rods held by said jaws, and an adjustable abutment member on said gage means for positioning the relatively movable jaws with respect to the relatively fixed jaws.

HERBERT P. HEATH.
KEITH A. WESTON.